(12) United States Patent
Rondeau et al.

(10) Patent No.: US 7,377,570 B2
(45) Date of Patent: May 27, 2008

(54) MODULAR COMPONENTS FOR AN ALL-TERRAIN VEHICLE

(75) Inventors: Pierre Rondeau, St-Denis-de-Brompton (CA); Jeannot Belanger, Granby (CA); Auger Guillaume, Danville (CA); Mathieu Audet, Montreal (CA)

(73) Assignee: Bombardier Recreational Products Inc., Valcourt (CA)

( * ) Notice: Subject to any disclaimer, the term of this patent is extended or adjusted under 35 U.S.C. 154(b) by 590 days.

(21) Appl. No.: 10/796,371

(22) Filed: Mar. 8, 2004

(65) Prior Publication Data

US 2004/0239088 A1    Dec. 2, 2004

Related U.S. Application Data

(60) Provisional application No. 60/467,566, filed on May 5, 2003, provisional application No. 60/452,498, filed on Mar. 7, 2003.

(51) Int. Cl.
*B60N 2/02* (2006.01)

(52) U.S. Cl. .................. 296/65.03; 296/37.1; 296/3; 297/195.13; 224/401; 224/539; 280/769; 180/908

(58) Field of Classification Search ............ 296/37.1, 296/65.03, 3; 297/195.13; 224/401, 539; 280/769; 180/908
See application file for complete search history.

(56) References Cited

U.S. PATENT DOCUMENTS

| 5,107,952 | A | * | 4/1992 | Matsubayashi et al. | ..... 180/349 |
| 5,306,156 | A |   | 4/1994 | Gibbs |  |
| 6,538,567 | B2 | * | 3/2003 | Stewart | ...... 340/475 |
| 2003/0102694 | A1 | * | 6/2003 | Rondeau et al. | ............ 296/195 |

* cited by examiner

*Primary Examiner*—Joseph D Pape
(74) *Attorney, Agent, or Firm*—Osler, Hoskin & Harcourt LLP

(57) ABSTRACT

An all-terrain vehicle (ATV) with an elongated wheelbase has a rear-mounted receptacle for receiving one of a plurality of interchangeable modular components, such as a passenger seat, a cargo container, a cargo rack, a flatbed or a workbench. The modular component has an electrical connection and a mechanical connector on an underside thereof which has hooks and posts for engaging, respectively, a transverse rod and sockets. A latching mechanism locks the modular component to the rear of the vehicle. Accordingly, the modular component is selectively releasable to easily and quickly interchange one modular component with another.

15 Claims, 8 Drawing Sheets

MODULAR COMPONENTS FOR AN ALL-TERRAIN VEHICLE

CROSS-REFERENCE TO RELATED APPLICATIONS

This application claims priority from U.S. Provisional Patent Application No. 60/452,498 filed Mar. 7, 2003 by Mathieu Audet and entitled REMOVABLE AND RETRACTABLE PASSENGER SEAT FOR AN ATV and 60/467,566 filed May 5, 2003 by Pierre Rondeau and entitled MODULAR PARTS FOR AN ALL TERRAIN VEHICLE. Both Applications are incorporated by reference herein.

TECHNICAL FIELD

The present invention relates generally to all-terrain vehicles (ATVs) and, more particularly, to multi-passenger ATVs having elongated wheelbases.

BACKGROUND OF THE INVENTION

ATVs have become very popular consumer products in recent years. These vehicles are typically used to travel undeveloped terrain, often called "off-road" connoting the lack of paved or even defined paths. An ATV is typically a small straddle-seated multi-wheeled vehicle, having handlebar steering. Conventionally, ATVs have been single-passenger vehicles, with the operator situated athwart the vehicle, between the front and rear axles, on a backless seat.

Because of the versatility of ATVs in negotiating diverse types of terrain, ATVs have proved invaluable in applications for both off-road work and recreation. Such applications may require the transportation of cargo over rugged terrain. Conventionally on an ATV, cargo space is typically situated behind or in front of the operator in the form of one or more cargo racks.

A number of devices have been developed to accommodate the demands of one or more of these applications. However, many of these devices suffer from the limitation that they must be somehow attached to the ATV in such a fashion as to ensure that neither the device nor its contents will be dislodged, and that the safe operation of the ATV will not be compromised.

Thus, typically such devices are bolted or otherwise secured to the front and/or rear cargo racks. Still others require attachment to the body or frame of the ATV itself. The installation process for such devices is often complex and time-consuming, so that the devices are not easily removable, much less interchangeable. The installation of these devices involves permanent alteration of the ATV body or frame. As well, the installation of such devices invariably restricts, sometimes to a great extent, the cargo capacity of the ATV, whether or not the device is being used.

Even so, the provision of cargo space may not satisfy the requirements of a particular application. Frequently, in affixing a tool or a component to the ATV to ensure that it is not dislodged during transport, the tool or component cannot be accessed by the operator unless it is at least partially unpacked or unloaded. Thus, where the tool or component is being used in a repetitive manner, an enormous amount of time may be expended simply in lashing and unlashing it from the ATV.

Moreover, ATVs do not conventionally provide any electrical power access to the user. While conceptually, the electrical system of the ATV could be modified to gain access to DC power, such modifications are beyond the technical skills of most ATV owners, and fraught with difficulties which could endanger the operator and which may void any applicable warranties. Such modifications are generally extensive, permanent and unsightly. Nevertheless, the provision of electrical power, whether in DC or AC format, would permit the installation of powered accessories that would greatly improve the utility, convenience and enjoyment of the ATV.

Similarly, ATVs typically do not provide a power take-off (PTO) outlet by which accessories may be driven from power generated by the ATV drive train. As with electrical power, the modification of a conventional ATV to access such power, while desirable, is neither practical nor feasible.

On occasion, it would be desirable to transport a passenger on an ATV. Because the seat provided is somewhat larger than would be required for an operator alone, there is a temptation to carry a passenger on the same seat, directly behind the driver. However, especially in light of the rugged terrain that must be traversed, doing so introduces a significant stability issue considering the center of gravity is moved much more towards the rear of the vehicle.

There have been attempts to provide after-market passenger seats that may be bolted to the cargo rack behind the driver's seat. However, in order to maintain the passenger's seat in place, elaborate and complicated locking systems are required, thus incurring time and inconvenience in installing and removing the seat in addition to loosing important limited rear cargo space.

In U.S. patent application Ser. No. 10/292,813 by Rondeau et al and assigned to the assignee of the present invention, and incorporated by reference herein, there is disclosed an extended wheelbase ATV which provides sufficient room between the front and rear axles to accommodate, in-line, both a driver and passenger seat. Because both the driver and passenger seating positions are centred over the ATV, the centre of gravity of the vehicle remains substantially centered, providing a more comfortable ride for both riders and maximizing the vehicle stability threshold.

However, in order to make sufficient room for a second seat, such ATVs generally have more limited cargo space than single passenger ATVs. Since the seat is contoured for a human passenger, it is not well suited to hauling cargo. It is not practical to remove the passenger seat from the ATV in order to increase cargo space. Thus, when the operator does not have a passenger to carry, the space now occupied by the passenger seat in such an ATV is wasted.

Accordingly, there remains a need in the art for a system for better utilizing the space created on a two-seater ATV with an extended wheelbase.

SUMMARY OF THE INVENTION

In one aspect the present invention resolves this problem by providing an ATV having a number of different interchangeable, easily-replaceable, cargo-carriers and passenger seats.

It is therefore an object of the present invention to provide an all-terrain vehicle comprising a frame; four wheels supporting the frame, two of which are front wheels and two of which are rear wheels, the front wheels defining a front axis and the rear wheels defining a rear axis; a wheelbase defined by the front axis and the rear axis; an engine disposed on the frame for driving at least one of the wheels; handlebars disposed on the frame for steering at least one of the wheels; a straddle driver's seat disposed on the frame; and a module receptacle on the frame, the module receptacle including a selectively releasable connector for selectively securing a modular component to the receptacle.

The module receptacle preferably uses the additional space provided between the front axle and the rear axle on an elongated wheel base ATV, i.e. an ATV having a wheelbase not less than 55 inches and preferably not greater than 78 inches. It allows that space to be selectively used for different purposes.

Optionally, the module receptacle is a first module receptacle, and the vehicle further comprises a second module receptacle on the frame, the second module receptacle including a selectively releasable connector for selectively securing the modular component to the receptacle, whereby the module component may be selectively secured to one of the first module receptacle and the second module receptacle.

The present invention also provides for a number of modular components sized and dimensioned to be secured to the receptacle and which comprise a connector suitable for mating with the connector of the module receptacle.

The modular components can be one of a variety of accessories including, but not limited to, passenger seats, cargo containers, cargo racks, flatbeds, and work benches. The modules are designed to be secured to the receptacle but they can be smaller or larger than the receptacle (depending on their purpose) and may thus extend onto the rear fenders or the rear rack.

The modular components are readily interchangeable by virtue of their each having a connector which mates easily with the connector of the receptacle disposed on the ATV. The connector is preferably designed to ensure quick installation and removal of the module on the vehicle.

According to another aspect of this invention there may be provided one or more of various types of mechanical and electrical connections between the module and the receptacle. The mechanical connections retain the module in the receptacle and the electrical connections provide electricity from the ATV to the module. The electricity provided by the receptacle comes from the vehicle's electrical system; it may be either AC or DC.

One other aspect of the present invention has a locking device to ensure the module can not be removed by an unauthorized person. A key can be use to lock the module in place in the receptacle.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
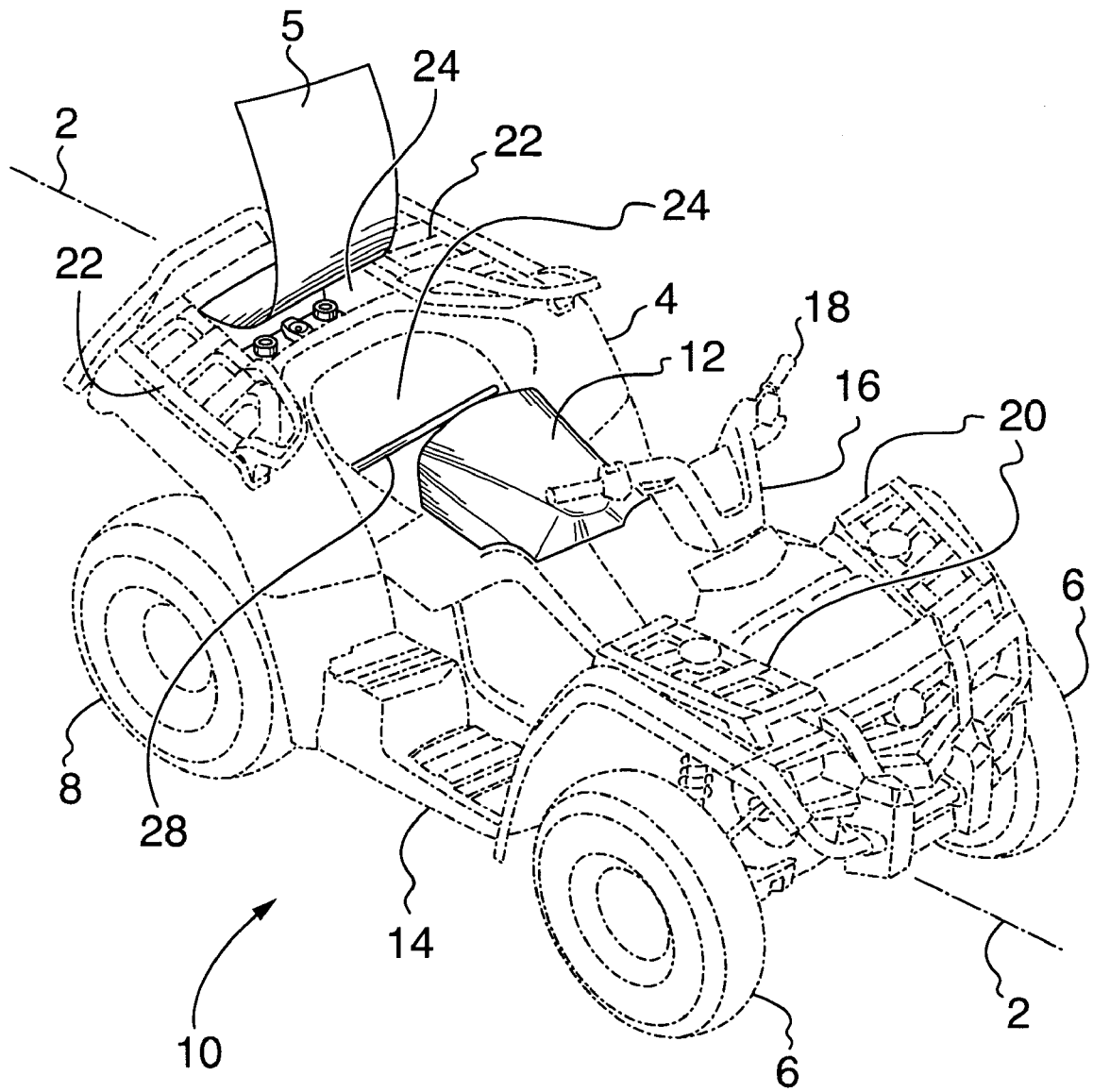
FIG. 1 is an isometric left-front view of an ATV in accordance with an embodiment of the present invention.

FIG. 1 illustrates an embodiment of an all-terrain vehicle (ATV) having a receptacle for receiving a modular component in accordance with the present invention.

As depicted in FIG. 1, the ATV, which is generally designated by reference numeral 10, is aligned along a longitudinal axis 2. The ATV has a frame (not shown in FIG. 1) which supports a body 4. The frame rotatably supports front and rear suspension systems to which are mounted front and rear wheels 6, 8, respectively, in a manner well known in the art. The wheel preferably have low-pressure balloon tires (i.e, between 1.5 and 4 psi) The ATV 10 may be a single-seat vehicle, a dual-seat vehicle or a multi-seat vehicle. Dual-seat and multi-seat vehicles may have an extended wheelbase of approximately between 55 and 78 inches.

As illustrated in FIG. 1, a driver seat 12 is mounted to the frame generally above an engine. The driver seat can support a driver in a straddle position with a leg on each side of driver seat. Footrests are mounted laterally to the sides of the ATV. Connected to the frame is a steering assembly 16, including handlebars 18, for steering the ATV.

As shown in FIG. 1, primary storage on the ATV 10 is provided by front cargo racks 20 and rear cargo racks 22 mounted to the body 4 substantially over the axles of the front wheels 6 and rear wheels 8, respectively. The front cargo rack 20 may have one or more portions over the fenders of the front wheels 6. Likewise, the rear cargo rack 22 may have one or more portions over the fenders of the rear wheels 8. Optionally, the front cargo rack 20 and rear cargo rack 22 may be integral with the body 4.

As shown in FIG. 1, the ATV has a receptacle 24 mounted to a rear portion of the vehicle permitting a variety of different modular components, or "modular modular components", to be interchangeably connected to receptacle at the rear portion of the vehicle. As shown in FIG. 1, the receptacle 24 may be covered with a removable shroud 5.

Figure 2:
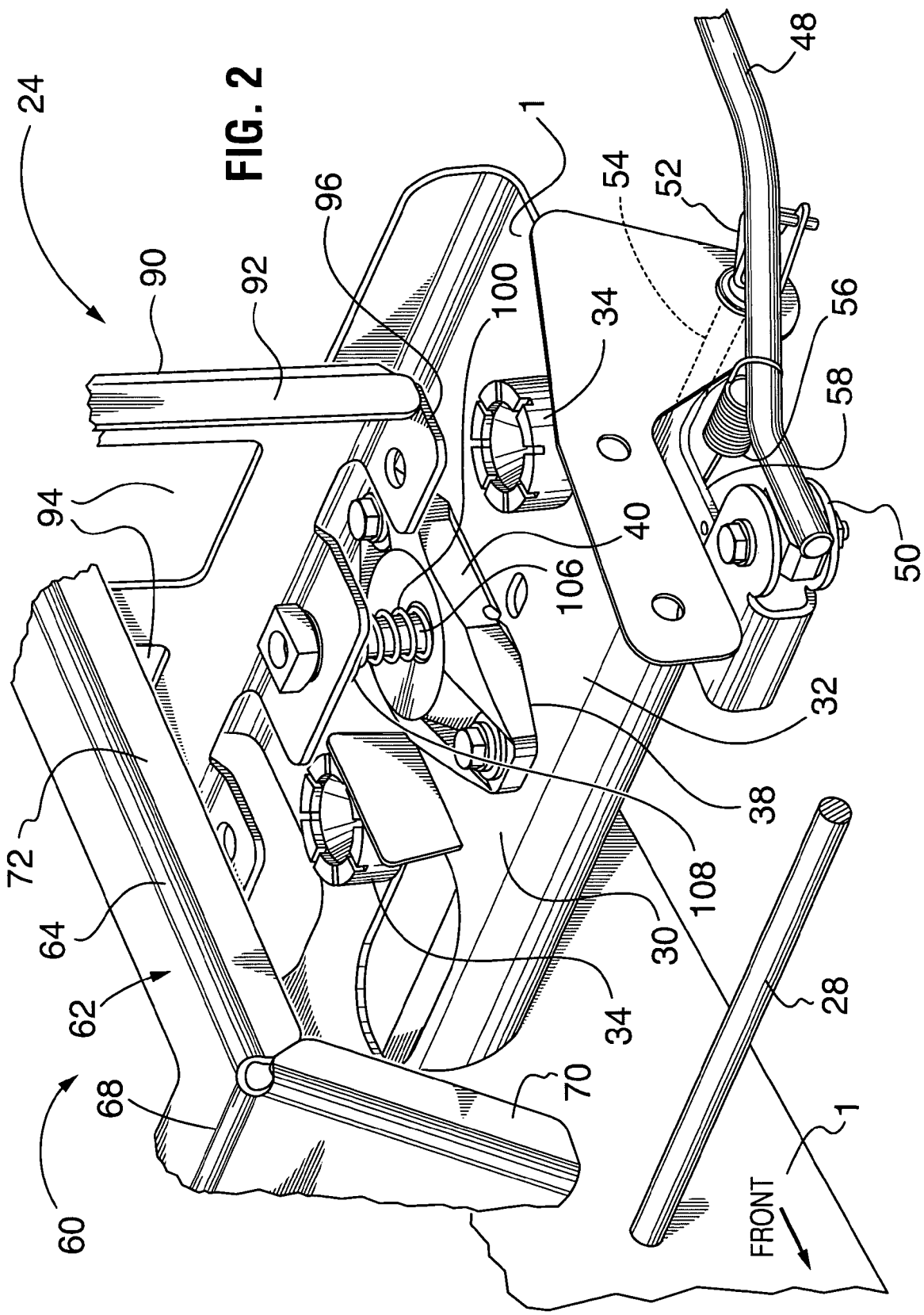
FIG. 2 is an isometric view of a rear portion of an ATV showing a receptacle in accordance with an embodiment of the present invention.

FIG. 2 illustrates the, receptacle 24 in greater detail. As noted earlier, the receptacle 24 is affixed to the rear portion of the ATV 10. Although the receptacle is shown mounted to the frame 1, it could also be connected to the vehicle's body instead or on any part of the vehicle offering sufficient strength to support the modules.

As illustrated in FIG. 2, the receptacle 24 has a rear plate 30 affixed to the frame 1. The rear plate 30 has an upper surface 32 with two spaced-apart cylindrical sockets 34. As shown in FIG. 2, a transversely mounted rod 28 is affixed to the frame 1 forward of the rear plate 30 for supporting the front part of the module via the hooks 82. The sockets 34 and the rod 28 cooperate to receive a modular component, or modular component. The sockets 34 are adapted to receive cylindrical seating posts affixed to the underside of the modular component whereas the rod 28 is adapted to engage one or more hooks affixed to the underside of the modular component. The interaction of these parts will be described in greater detail below.

In order to facilitate the insertion of the seating posts into the respective sockets, the sockets may be made of plastic and/or may have flared openings. Further, to accommodate the seating posts, holes may be drilled in the transverse plate 32 beneath and in alignment with the sockets so that the seating posts may pass through the rear plate 30.

As depicted in FIG. 2, a locking latch 38 is affixed to the rear plate 30 between the sockets 34. The locking latch is adapted to receive a shaped locking post as will be described below in greater detail. The locking latch 38 has a cylindrical base member 40 which is bolted to the rear plate 30 substantially along the longitudinal axis of the frame 1. The cylindrical base member 40 has a central bore for housing a locking post 100. The cylindrical base member 40 is preferably made of metal. A hole in the rear plate 30 is drilled coaxial with the cylindrical base member to accommodate the locking post 100. The locking post 100 has a spring or other resilient element 106 mounted thereon to bias the locking post 100 away from the rear plate 30. The locking post also has an elastomeric member 108 seated about an intermediate portion between the resilient element 106 and a flange 96 of a rear extension 90 to provide a shock absorption when a modular component engages the receptacle 24.

As depicted in FIG. 2, a pull rod 54 is connected by a linkage to a latch release lever 48 that is accessible under one of the rear wheel fenders. As shown in FIG. 2, the latch release lever 48 is pivotally connected to the frame 1 at a first pivot 50. The latch release lever 48 is pivotally connected to the pull rod 54 at a second pivot 52. The latch release lever 48 is furthermore attached by a coil spring 56 to an anchor point 58 on the frame 1. The coil spring 56 is located between the first and second pivots. To disengage the pull rod 54 from the locking post, the latch release lever is actuated by pivoting the latch release lever in a generally horizontal plane so that the lever yaws outwardly from the longitudinal axis 2 of the ATV 10. When the lever is released by a human operator, the coil spring 56 will return the lever to its resting position alongside the frame of the vehicle.

A modular connector 60 is partially shown in a cutaway view in FIG. 2. The modular connector 60 secures a modular component (or modular component) to the receptacle 24. The modular connector 60 has a connector frame 62, preferably made of rigid material such as aluminum or plastic, to which are affixed a forward extension 70 and a rearward vertical extension 90. The forward vertical extension supports a hook assembly for hooking onto the rod 28. The rearward vertical extension supports a three-prong post assembly for connecting to the sockets, as described above. The embodiment disclosed in the preferred embodiment is made of a stamped aluminum sheet forming a three-dimensional structure but could also be made of an injected plastic part or a die-cast part. A person skilled in the art will see various ways to install modules on the vehicle.

As shown in FIG. 2, the connector frame 62 is composed of longitudinal members 64 and transverse members 68. The extensions 70, 90 support the connector frame 62 above the frame 1, so as to permit sufficient clearance that the body 4 and the rear cargo rack 22 may pass between the connector frame 62 and the frame 1. The extensions 70, 90 are able to support various modular components, or modular components, 120 which may be attached to the connector frame 62, together with any anticipated payload. Preferably, the extensions 70, 90 are joined in a spaced-apart relation by spacer sections 72 that extend along the length of the longitudinal members 64. The vertical extensions 70, 90 and the spacer sections 72 are preferably formed out of a single shaped metal sheet. Alternatively, the vertical extensions 70, 90 and the spacer sections 72 may be formed independently and welded or otherwise fastened together. Here again a skilled worker in the art would easily see many ways to build an easy to remove receptacle-module system installed on the vehicle using the space provided by the passenger seat on an extended wheel base all terrain vehicle.

Figure 3:
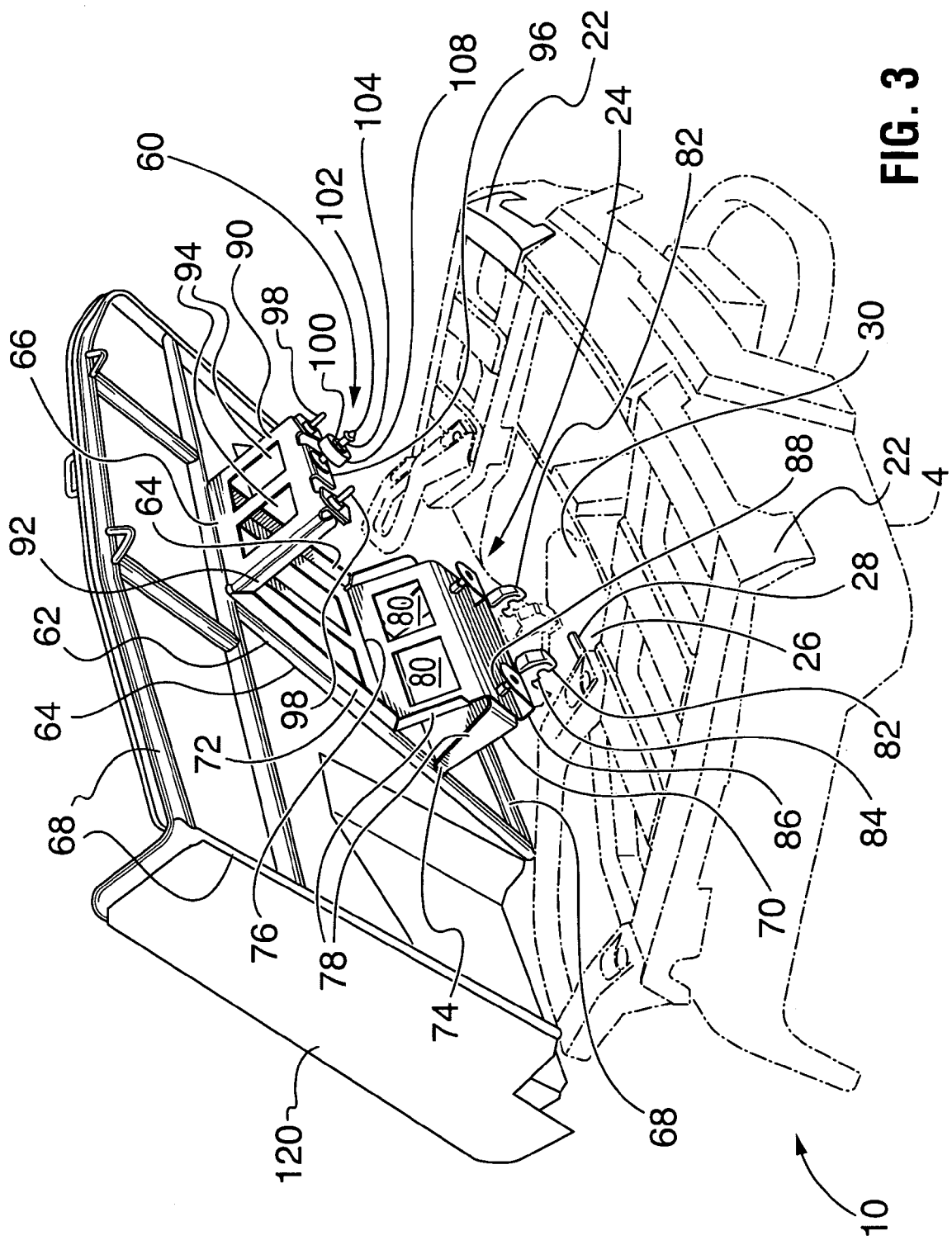
FIG. 3 is an isometric view of the underside of a modular modular component showing a modular connector in accordance with an embodiment of the present invention.

Illustrated in FIG. 3 is the modular connector 60 affixed to the underside of a modular component 120. In this figure, the modular component 120 is, shown to be a rear cargo rack although many other types of modular components may be interchangeably installed, as will be described below. In FIG. 3, the modular component 120 (i.e., the cargo rack) is shown disengaged from the receptacle 24.

As illustrated in FIG. 3, a first or forward extension 70 is a truncated wedge-shaped structure made of sheet metal, with its upper portions fastened at two contact portions 74, 76 of the connector frame 62. Side flanges 78 are provided along some of the edges of the forward extension 70 to provide support against buckling while adding lateral stability and may be affixed to corresponding portions of the longitudinal members 64 of the connector frame 62 by welding or other known fastening means. Optionally, openings 80 may be made in the surface of the forward extension 70 to reduce the weight of the modular connector 60 while maintaining strength and rigidity.

The lower (truncated) end of the forward extension 70 terminates in a plurality of hooks 82. In the embodiment shown in the figures, there are two hooks 82 aligned transversely of the frame. The two hooks 82 on the forward extension 70 each have a generally C-shaped lip 84. The interior of the C-shaped lip is adapted to hook and pivot about the transversely mounted rod 28. The hooks 82 are mounted at an oblique angle relative to the truncated end of the forward extension 70, so that when the hooks 82 of the forward extension 70 are pivoted about the transverse rod 28 to their fullest extent, and the connector frame lies parallel to the frame 1, the C-shaped lips 84 pass beneath the transverse rod 28 so that the connector frame 62 cannot be dislodged from the receptacle except by a pivoting motion in the opposite direction. In particular, any vertical upward force applied to the connector frame 62 will not dislodge it from the receptacle 24 when the hooks 82 are fully engages. The hooks 82 may be made of aluminum, plastic, steel or other material.

Still referring to FIG. 3, the lower (truncated) end of the forward extension 70 also has a pair of lateral flanges 86 disposed adjacent and outside the hooks 82. These lateral flanges 86 present a small planar surface to the transverse rod 28 that limits the downward motion of the modular connector 60 relative to it and provides some shock absorption. These flanges 86 comprise a small piece of sheet metal affixed at one end to the sheet metal portion of the forward extension 70, and defined by a pair of bends in the same direction. The lateral flanges 86 are supported by a metal post 88 between them and the forward extension 70.

As shown in FIG. 3, the rearward vertical extension 90 is reinforced along its sides by side flanges 92 to provide stability against buckling of the extension. Optionally, openings 94 may be provided in the rearward vertical extension 90 to reduce the weight of the modular connector 60. An upper end of the rearward vertical extension 90 is fixed by welding or other known fastening means to the rearmost transverse member 66 of the connector frame 62 while the side flanges 92 are secured to the longitudinal members 64 of the connector frame 62.

As shown in FIG. 3, the lower end of the rearward vertical extension 90 terminates in a flange 96 having a number of openings through which two seating posts 98 and a locking post 100 can extend. The seating posts and locking post are aligned transversely to the longitudinal axis 2 of the frame 1. The seating posts match up with the sockets described above whereas the locking post fits through the central hole beneath the locking latch. When the seating posts are inserted into the sockets, the modular connector 60 cannot move longitudinally which therefore precludes the unintentional disengagement of the hooks 82 from the transverse rod 28.

To engage and lock the modular component to the vehicle, it is first necessary to engage the rod 28 with the hooks 82 and then to pivot the modular component downward until the seating posts are aligned with their respective sockets. By pressing downward on the rearward portion of the modular component, the seating posts are seated in their respective sockets and the locking post is clicked into locking engagement with the pull rod.

Figure 4:
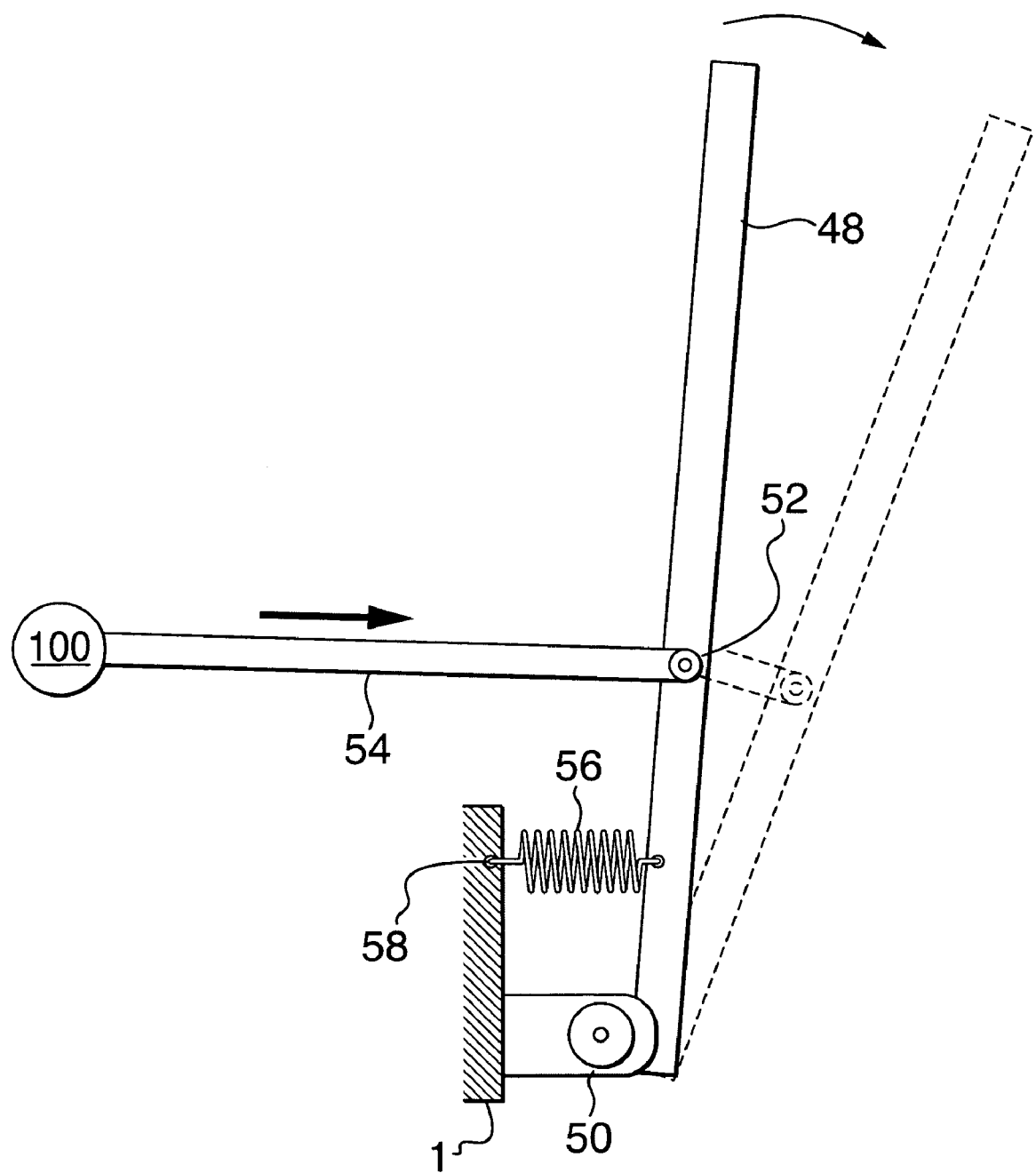
FIG. 4 is a schematic top view of the latch release assembly shown in FIG. 2.

To unlock and disengage the modular component from the vehicle, an operator must actuate the latch release lever 48 in the manner illustrated in FIG. 4. By pulling outwardly on the lever (in the direction of the arrow), the lever pivots about the first pivot 50 to the position shown by the stippled lines. Consequently, the pull rod 54, which is pivotally connected to the lever 48 at the second pivot 52, retracts and thus disengages from the locking post 100. When the operator releases the lever 48, the coil spring 56, which is attached to the frame at anchor point 58, forces the lever back to its original position (shown in solid lines).

Figure 5:
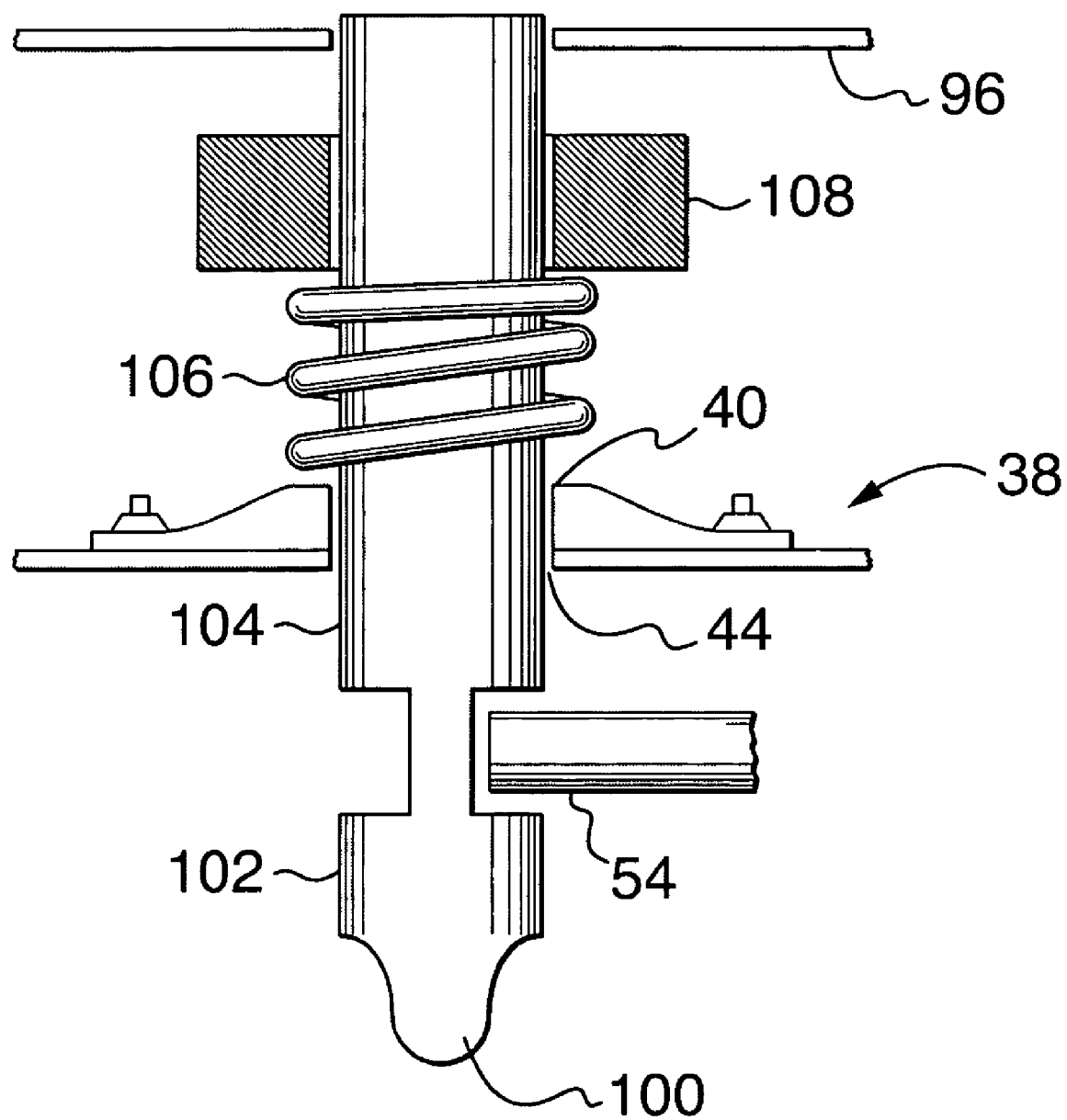
FIG. 5 is a schematic side view of the interlocking of the receptacle shown in FIG. 2, the modular connector shown in FIG. 3 and the latch release assembly shown in FIG. 4.

As depicted in FIG. 5, the pull rod 54 engages the locking post 100 to lock the connector module to the receptacle. The locking post has a lower cylindrical portion 102 and an upper cylindrical portion 104 with an intermediate cylindrical portion of reduced diameter located in between the upper and lower portions. When fully engaged, the pull rod 54 is vertically restrained by annular shoulders defined by the upper and lower portions.

To detach the modular component 120 from the vehicle, the latch release lever 48 is pulled away from the frame 1, retracting the pull rod 54 from the locking post 100. The posts 98, 100 are retracted from the sockets 34 and then the modular component 120 is pivoted about the rod 28. The hooks 82 are then disengaged from the rod 28 and the modular component 120 can then be lifted clear of the ATV 10 whereupon a new modular component can be quickly and easily attached to the ATV 10.

Figure 6:
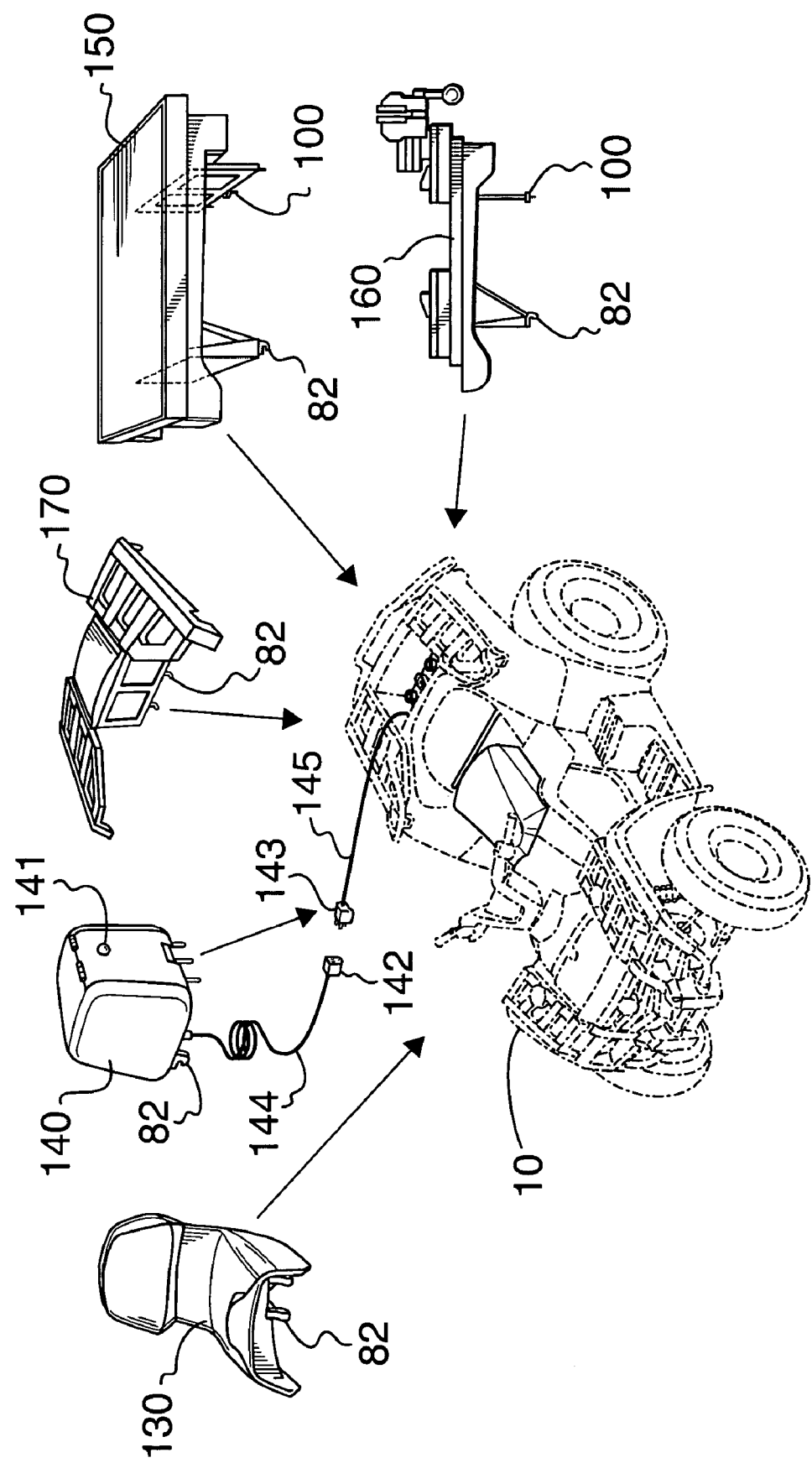
FIG. 6 is an isometric view of an ATV with a variety of interchangeable modular sub-assemblies in accordance with embodiments of the present invention.

As shown in FIG. 6, a variety of modular components 120 may be interchangeably mounted on the ATV 10. For example, the modular component 120 may be a rear passenger seat 130, a cargo container 140, a flatbed 150, a work bench 160 (with or without the illustrated vise grip), or a rear cargo rack 170.

The cargo container 140 is electrically and electronically connected to the vehicle using a wire 144 connected to cargo container 140, a connector 142, 143 adapted for being disconnected when the modular component is removed and a wire 145 connecting the vehicle's electrical circuit. A position light and a brake light 141 is powered by the electrical connection.

Figure 7:
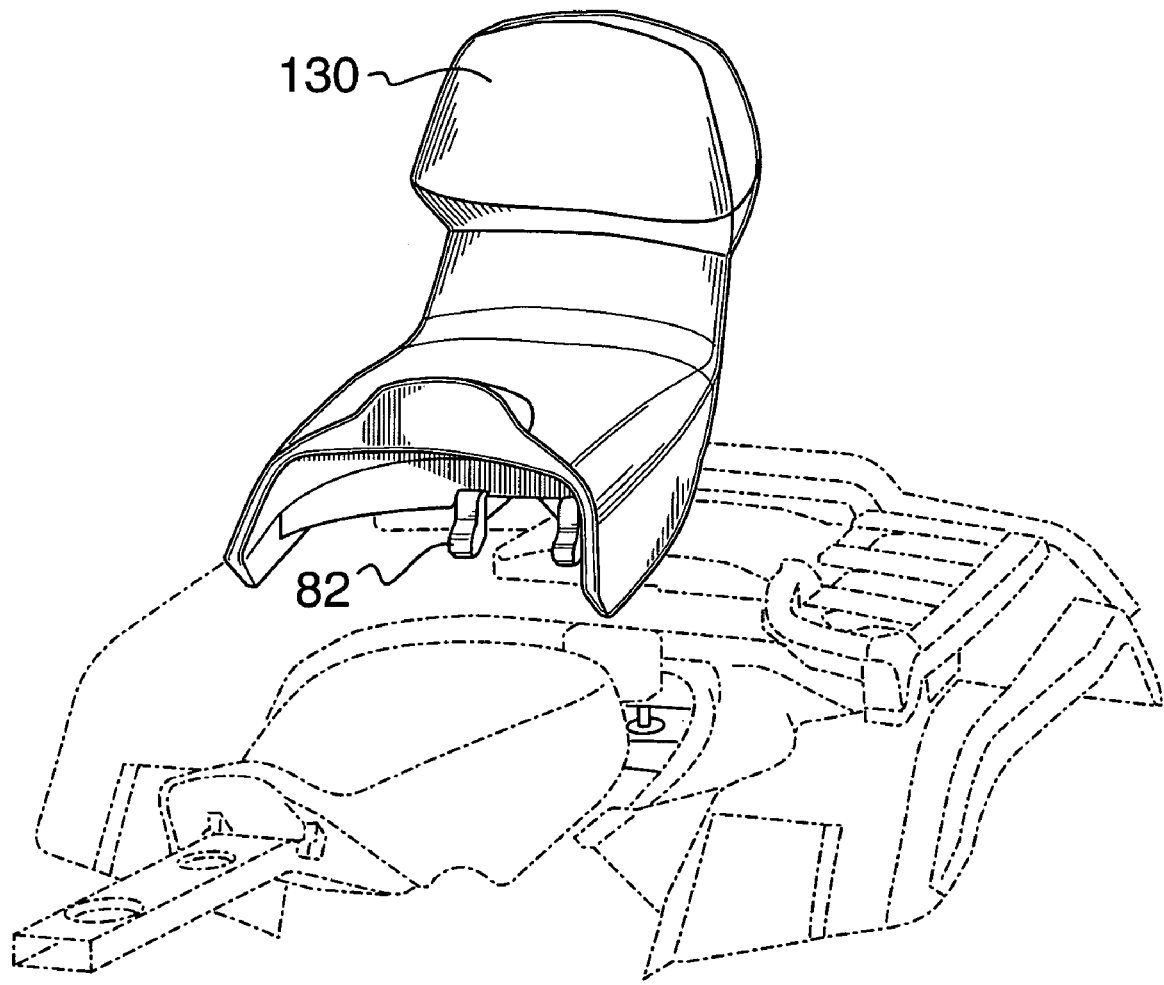
FIG. 7 is an isometric view of a modular passenger seat shown disengaged from a rear portion of an ATV in accordance with an embodiment of the present invention.
Figure 8:
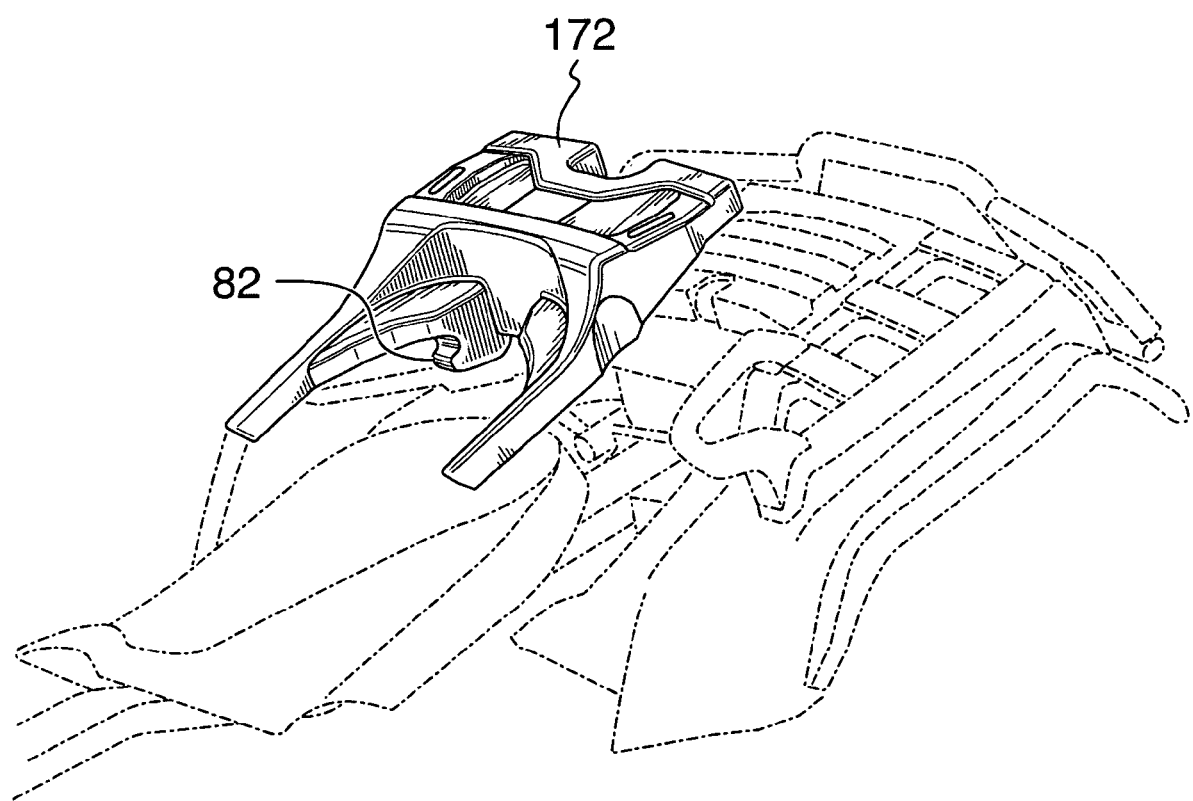
FIG. 8 is an isometric view of a modular rear rack extension shown disengaged from a rear portion of an ATV in accordance with an embodiment of the present invention.

The rear passenger seat 130 is illustrated again in FIG. 7. The rear passenger seat 130 may have a backrest, as shown, and optional armrests for the comfort of the passenger. As a modular component, the passenger seat may be removed when there is no passenger aboard to make room for another module that could provide cargo or other equipment or features useful for the driver or the work performed with the vehicle. The receptacle is located behind the driver's seat and has a limited size. The modules that fits the receptacle can be smaller or larger than the receptacle thus extending on the rear fenders or the rear rack. The connection between the module and the receptacle is not a limitation as to the size of the module. However, it could be appreciated by the skilled worker the size of the module must not affect the stability of the vehicle.

In addition to those exemplary modular components illustrated in FIG. 6, other types of modular components may be provided for interchangeable connection to the ATV. For example, the modular component may be any platform, ranging from a rear rack extension 172, that is co-planar with the rear rack 22 and significantly enlarges the load-bearing area, to a covered luggage rack, pickup box, or transport cage. Additionally, the modular component 120 may be a more specialized cargo platform, such as a lumber rack or a rack for holding guns, fishing, archery, ski, snowboard or snowshoe recreational equipment. Conceivably, the modular component 120 may constitute a specialized platform for transporting small watercraft.

The versatility of such platforms could be enhanced by making them tiltable. This could be achieved by introducing a tilting mechanism on the platform itself, or by introducing a tilting frame pivotally attached to the connector frame 62 at one end, preferably the rear end, to which the platform is affixed.

In addition to such platforms, there is opportunity to mount more specialized tools and equipment on the ATV 10 as a modular component 120, such as a tank for holding compressed gas, or liquids ranging from potable or non-potable water or chemicals, a hose and reel assembly and/or a pump for distributing such gas or liquid.

In addition, the modular component 120 may constitute a machine tool, tool stand, or metal welding surface, so as to facilitate off-road construction or repairs. In this vein, the modular component 120 may have mounted on it, in addition to or in substitution for the foregoing, a vise, toolbox or a gas torch.

The modular connector 60 may also be used to mount such diverse equipment as a trailer hitch, a snow plow attachment and/or a barbecue to the ATV 10 as required.

The modular component 120 need not be limited to cargo-type modular components. As noted above, the modular component 120 could be a passenger seat, or there may be separate sub-assemblies 120 for accommodating various passenger size. Such a passenger seat may have arm rests and/or a back rest. There may also be a modular component 120 that incorporates a stretcher system for first aid situations.

As disclosed in U.S. Provisional Patent Application No. 60/452,498, the passenger seat may be made foldable and vertically retractable so that the folded back rest lies in a plane with the rear rack 22 and may accommodate a cargo load thereon. The seat portion and/or the back rest of the passenger seat may be contoured so as to provide a back rest to the driver seat 12. The modular component 120 may also be configured to provide an enclosure to the passenger seat or stretcher, and even the driver's seat 12.

As indicated previously, there are numerous potential applications for a modular component 120 to which is provided electrical power drawn from the ATV's 10 electrical system. Such power could easily be provided to the receptacle 24 and made available to the connector 60 through a simple plug-in connection after the two have been mated in the manner described above. For example, the receptacle 24 could be provided with an accessory power outlet similar to those found in automobiles, and the connector 60 or even the modular component 120 could be fitted with a standard 12 V DC car adapter connection.

Alternatively, a fixed connection could be provided that is automatically engaged when the modular connector 60 is mounted onto the receptacle 24, for example, by placing an electrical contact at the base of one of the sockets 34 to provide power derived from the ATV's 10 electrical system. The corresponding seating posts 98 could be used to complete the electrical connection to the modular component on the connector frame 62, terminating in a 12 V DC car adapter outlet on the connector frame 62. A rear position/brake light can be mounted on the module and electricity will be provided by the electrical connector between the module and the receptacle. The electrical connector on the receptacle may not only provide a constant electrical current, the current could be modulated in respect of a specific use like, for instance, a rear brake light. The electrical connector on the receptacle can also communicate data to the module thus sending both power and signal to the module and vice-versa.

If AC power is required, the modular component 120 could have a power inverter mounted thereon, to transform the DC power obtained from the ATV's 10 electrical system into AC power. The power inverter could make this power available through a standard electrical outlet.

With electrical power, the range of modular components 120 could be considerably broadened. For example, the modular component 120 could comprise a power tool, such as a power saw, whether handheld or mounted in a saw table, a mitre saw, a bandsaw or a grinder or any tool having an electric motor.

Additionally, a whole panoply of lighting and communication devices may be provided, such as a spotlight or search light, a brake light, a rear positioning light, a music system, a radio, a communications system, a public address system, or a global positioning system receiver.

The provision of power may also enhance some of the above-described modular components 120. For example, in addition to a barbecue, the modular component 120 may have a cooler or freezer. The passenger seat may be fitted with any or all of a headset communication system, grab handle heating system, seat heating system, floor heating system or reading light to enhance the comfort of the passenger and/or the driver.

Furthermore, a modular component 120 could have a a power take-off (PTO) for driving an implement or tool, such as a portable mill, that can be conveyed to the site on the back of the ATV 10 and dismounted at the site for connection behind the ATV 10 using a standard PTO shaft. If the modular component 120 is also mounted on wheels, it may be dismounted, connected to the PTO connection and drawn behind the ATV 10 while in operation. Thus, the modular component 120 may constitute such conventional towed farm or forestry implements as a seeder, harvester, lawn mower or snowblower. Alternatively, the implement or tool could remain mounted on the back of the ATV 120 and a PTO linkage created to bring the PTO connection up to its level. The PTO connection could also be used to drive a PTO generator that would be able to generate significant amounts of single-phase or three-phase AC power of significantly greater power than that possible with a power inverter of a 12 V DC signal.

It will be apparent to those skilled in this art that various modifications and variations may be made to the embodiments disclosed herein, consistent with the present invention, without departing from the spirit and scope of the present invention.

For example, not only could the modular component 120 be made tiltable relative to the connector 60, but the modular component 120 could be mounted on a sliding base relative to the connector frame 62, to permit it to be moved laterally relative to the ATV 10 if needed.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the appended claims.

What is claimed is:

1. An all-terrain vehicle comprising:
a frame;
at least four wheels supporting the frame, two of which are front wheels and two of which are rear wheels, the front wheels defining a front axis and the rear wheels defining a rear axis;
a wheelbase defined by the front axis and the rear axis;
an engine disposed on the frame for driving at least one of the wheels;
handlebars disposed on the frame for steering at least one of the wheels;
a straddle driver seat disposed on the frame;
a module receptacle on the frame, the module receptacle including a selectively releasable connector for selectively securing a modular component to the receptacle;
a modular component releasably secured to the receptacle; and
a release lever movable between a first position and a second position, the release lever being operatively connected to the selectively releasable connector, the release lever being biased toward the first position,
wherein the selectively releasable connector secures the modular component to the receptacle when the release lever is in the first position, and wherein the selectively releasable connector releases the modular component from the module receptacle when the release lever is in the second position so as to permit removal of the modular component from the receptacle.

2. The all-terrain vehicle as claimed in claim 1, wherein the wheelbase is not less than 55 inches.

3. The all-terrain vehicle as claimed in claim 1, wherein the wheelbase is between 55 and 78 inches.

4. The all-terrain vehicle as claimed in claim 1, wherein the receptacle is disposed substantially behind the driver's seat.

5. The all-terrain vehicle as claimed in claim 1, wherein the receptacle is disposed behind the driver's seat.

6. The all-terrain vehicle as claimed in claim 1, further comprising an electrical connector for providing an electrical connection to the modular component.

7. The all-terrain vehicle as claimed in claim 1, wherein the modular component is selected from a group consisting of a passenger seat, a cargo container and a cargo rack.

8. The all-terrain vehicle as claimed in claim 4, wherein the receptacle is adapted to secure the modular component at a forward connection point and at a rearward connection point.

9. The all-terrain vehicle as claimed in claim 4, wherein the connector comprises one of a post adapted to engage a socket disposed on the modular component and a socket adapted to engage a post disposed on the modular component.

10. The all-terrain vehicle as claimed in claim 4, wherein the connector comprises one of a rod adapted to be engaged by a hook disposed on the modular component and a hook adapted to engage a rod disposed on the modular component.

11. The all-terrain vehicle as claimed in claim 4, wherein the connector comprises one of a locking post adapted to engage a latch mechanism on the modular component and a latch mechanism adapted to engage a locking post on the modular component.

12. The all-terrain vehicle as claimed in claim 1, wherein the modular component includes a passenger straddle seat.

13. The all-terrain vehicle as claimed in claim 1, wherein the modular component includes a cargo rack.

14. The all-terrain vehicle as claimed in claim 1, wherein the wheels each include a low-pressure balloon tire.

15. The all-terrain vehicle as claimed in claim 1, wherein the module receptacle is a first module receptacle, and wherein the vehicle further comprises a second module receptacle on the frame, the second module receptacle including a selectively releasable connector for selectively securing the modular component to the receptacle, whereby the module component may be selectively secured to one of the first module receptacle and the second module receptacle.

* * * * *

UNITED STATES PATENT AND TRADEMARK OFFICE
CERTIFICATE OF CORRECTION

PATENT NO.         : 7,377,570 B2
APPLICATION NO. : 10/796371
DATED                 : May 27, 2008
INVENTOR(S)      : Pierre Rondeau et al.

Page 1 of 1

It is certified that error appears in the above-identified patent and that said Letters Patent is hereby corrected as shown below:

Title page, (75) Inventors:

Replace "Auger Guillaume" with -- Guillaume Auger --

Signed and Sealed this

Twenty-sixth Day of August, 2008

JON W. DUDAS
*Director of the United States Patent and Trademark Office*